United States Patent
Dutta et al.

(10) Patent No.: US 8,670,407 B2
(45) Date of Patent: Mar. 11, 2014

(54) PROXY MOBILE IP

(75) Inventors: Ashutosh Dutta, Bridgewater, NJ (US); Funchun Joe Lin, Morristown, NJ (US); Subir Das, Belle Mead, NJ (US); Dana Chee, Maplewood, NJ (US); Hidetoshi Yokota, Minuma (JP); Tsunehiko Chiba, Saitama (JP)

(73) Assignees: Telcordia Technologies, Inc., Piscataway, NJ (US); KDDI Corporation, Tokyo (JP)

( * ) Notice: Subject to any disclaimer, the term of this patent is extended or adjusted under 35 U.S.C. 154(b) by 843 days.

(21) Appl. No.: 12/012,014

(22) Filed: Jan. 30, 2008

(65) Prior Publication Data

US 2008/0285518 A1  Nov. 20, 2008

Related U.S. Application Data

(60) Provisional application No. 60/930,407, filed on May 16, 2007.

(51) Int. Cl.
*H04W 4/00* (2009.01)

(52) U.S. Cl.
USPC .......................................... 370/331; 455/436

(58) Field of Classification Search
USPC ........................................................ 370/331
See application file for complete search history.

(56) References Cited

U.S. PATENT DOCUMENTS

| | | | |
|---|---|---|---|
| 6,907,033 B2 * | 6/2005 | Faccin | 370/352 |
| 6,999,437 B2 * | 2/2006 | Krishnamurthi et al. | 370/331 |
| 7,307,967 B2 * | 12/2007 | Iwasaki et al. | 370/328 |
| 2001/0046223 A1 * | 11/2001 | Malki et al. | 370/338 |
| 2003/0225892 A1 * | 12/2003 | Takusagawa et al. | 709/227 |
| 2004/0105408 A1 * | 6/2004 | Suh et al. | 370/331 |
| 2005/0163080 A1 * | 7/2005 | Suh et al. | 370/331 |
| 2005/0180372 A1 * | 8/2005 | Cho et al. | 370/342 |
| 2006/0159050 A1 * | 7/2006 | Kim et al. | 370/331 |
| 2008/0162936 A1 * | 7/2008 | Haddad | 713/171 |
| 2009/0238193 A1 * | 9/2009 | Nishida et al. | 370/401 |
| 2009/0279452 A1 * | 11/2009 | Akiyoshi | 370/254 |
| 2010/0220738 A1 * | 9/2010 | Sarikaya | 370/401 |
| 2011/0007711 A1 * | 1/2011 | Muhanna et al. | 370/331 |
| 2011/0083048 A1 * | 4/2011 | Yan et al. | 714/57 |
| 2011/0110335 A1 * | 5/2011 | Weniger et al. | 370/331 |

OTHER PUBLICATIONS

International Search Report, dated May 23, 2008.

(Continued)

*Primary Examiner* — Bunjob Jaroenchonwanit
(74) *Attorney, Agent, or Firm* — Philip J. Feig

(57) ABSTRACT

A system and method for route optimization in PMIP having a first mobile node having a local mobility anchor and anchored at an access router and a second mobile node anchored at an access router is presented. The method includes establishing a binding cache at one access router comprising a mapping of mobile node addresses to access router addresses, populating the binding cache, and updating the mapping of the mobile node addresses in response to a handoff of a mobile node from one access router to another access router, so that a packet is transmitted from the first mobile node to the second mobile node using the mapping in the binding cache. The second access router address is obtained by either transmitting the packet from the first mobile node to the local mobility anchor, or querying neighboring access routers, or broadcasting access router addresses from the local mobility anchor.

6 Claims, 13 Drawing Sheets

(56) References Cited

OTHER PUBLICATIONS

J. Kempf, Ed., "Goals for Network-Based Localized Mobility Management (NETLMM)," NETLMM Working Group, RFC 4831, Apr. 2007 http://www.rfc-editor.org/rfc/rfc4831.txt.

J. Kempf, Ed., "Problem Statement for Network-Based Localized Mobility Management (NETLMM)", NETLMM Working Group, RFC 4830, Apr. 2007 http://ww.rfc-editor.org/rfc/rfc4830.txt.

C. Vogt, J. Kempf, "Security Threats to Network-Based Localized Mobility Management (NETLMM)", NETLMM Working Group, RFC 4832, Apr. 2007 http://www.rfc-editor.org/rfc/rfc_4832.txt.

* cited by examiner (PATH OPTIMIZATION FROM MN2 TO MN1)

(PATH OPTIMIZATION FROM MN2 TO MN1 AFTER HANDOVER)

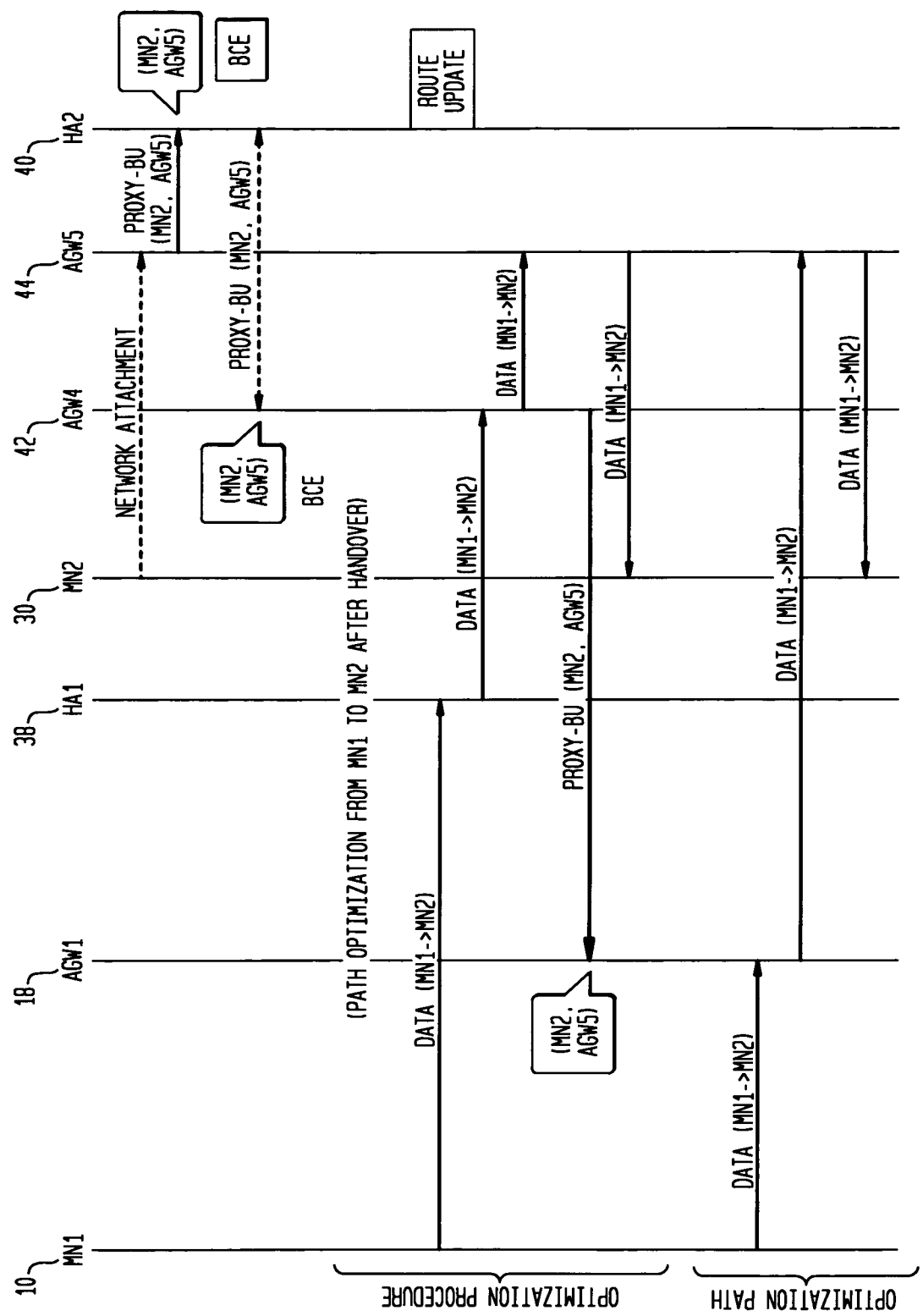

PROXY MOBILE IP

CROSS REFERENCE TO RELATED APPLICATION

The present invention claims the benefit of U.S. provisional patent application 60/930,407 filed May 16, 2007, the entire contents and disclosure of which is incorporated herein by reference.

FIELD OF THE INVENTION

The present invention relates generally to mobility management in next generation wireless networks. In particular, the invention relates to route optimization techniques for proxy mobile IP dedicated to support both local mobility and global mobility and provide seamless communication.

BACKGROUND OF THE INVENTION

Wireless Service Providers, or WISPs, strive to provide secured and seamless connectivity to the roaming users. Quality of existing communication gets degraded when a mobile is subjected to repeated handoff due to delay and packet loss. There are several transition events during the handoff such as discovery, configuration, authentication, security association, binding update and media redirection that contribute to the handoff delay and the associated packet loss. Several optimization techniques are being developed to address each of these handoff components. Currently, there are several types of mobility protocols, or mobile internet protocols (MIP), at different layers such as MIPv4, MIPv6, Host Identity Protocol (HIP), Session Initiation Protocol (SIP) and their faster variants such as Fast Mobile IPv6 (FMIPv6), and regional MIPv4 that can be used to take care of these handoff events. These mobility protocols are meant to reduce the packet loss and handoff delay during a mobile's change of connectivity from one point-of-attachment to another. However, these mobility protocols are not very suitable when a mobile's movement is confined to a domain and the communicating host is far off, or if both the communicating hosts are away from home. In order to reduce the delay due to binding update and associated one-way delay due to media transfer when a mobile's movement is confined to a specific domain, various local mobility management protocols have been designed. These include Cellular IP, Handoff Aware Wireless Access Internet Interface (HAWAII), Intra-Domain Mobility Management Protocol (IDNP), Hierarchical Mobile IPv6 (HMIPv6), among others. Proxy MIP (PMIP) is one such localized mobility protocol that helps to reduce the delay due to long binding update. It takes much of the burden away from the mobile and puts it on the access routers or proxy mobility agents within the network. Proxy mobility agents send the binding update to the home agents on behalf of the mobiles. Each mobile is anchored with a certain PMA (Proxy Mobility Agent) until it hands off to a new PMA.

In order to avoid the drawbacks associated with the global mobility protocols, such as MIP and SIP, that heavily depend upon mobility stack on the mobile node and optimize the mobility for a localized mobility domain, Network-based Localized Mobility Management (NETLMM) working group of the Internet Engineering Task Force (IETF) was created. NETLMM working group has created several Request for Comments documents, e.g., RFC 4830, RFC 4831, and RFC 4832, outlining the guidelines for designing a localized mobility protocol that will avoid the dependence upon the host to do binding update (BU) and limit the signaling updates when the mobile node moves within a domain. A few candidate protocols are currently being discussed, such as network-controlled local mobility and Proxy Mobile Internet Protocol (PMIP), including PMIPv4 and PMIPv6. These protocols are designed to take care of local mobility and, instead of depending upon a mobility stack in the mobile node, are controlled by the network elements in the edge routers.

PMIP, for example, does not use any mobility stack on the mobile node but rather uses Proxy Mobile Agents (PMAs) that can co-locate with the edge routers to help perform the mobility functions, such as the BU to the home agent (HA). As long as the mobile node moves within the same domain that has PMAs, the mobile node assumes that it is in a home link. The PMA is responsible for sending the proper mobile prefix as part of the router advertisement for stateless auto-configuration, or the PMA can also act as a Dynamic Host Configuration Protocol (DHCP) relay agent for stateful auto-configuration. In some cases, PMA can be referred to as a MAG (Mobility Access Gateway) and HA can be replaced by LMA (Local Mobility Agent). Thus, PMA and MAG can be used interchangeably and HA and LMA can be used interchangeably.

FIG. 1 describes the network elements and processes associated with PMIP operation. After the mobile node 10 connects to the new point-of-attachment as part of the initial bootstrapping process, or after the movement from the home network 12 to a new domain, e.g., Visited1 16, access is authenticated with the designated AAA server 14 (1: access initiation; 2: AAA Request/Reply). During this process, PMA1 18 sends the BU to the HA 20 with the address of the PMA that is specific to the home prefix of the mobile node 10, i.e., PMA1 18, (3: Proxy BU) and receives an acknowledgement (ACK) (4: Proxy ACK). In the absence of a pre-existing tunnel, this process helps to set up a tunnel, i.e., PMIP tunnel-1 22, between the HA 20 and the respective PMA (5: PMIP Tunnel-1). The mobile node 10 configures its address using the prefix included in the router advertisement and interface-id, which can be assigned by PMA1 18 or created by itself (6: home prefix advertisement).

FIG. 1 also illustrates the movement of the mobile node from one domain, Visited1 16, to another domain, Visited2 24. After the move, access is authenticated with the designated AAA server 14 (7: access initiation; 8: AAA Request/Reply). During this process, as before, PMA sends the BU to the HA 20 with the address of the PMA that is specific to the home prefix of the mobile node 10, i.e., PMA2 26, (9: Proxy BU), and receives a reply (10: AAA Query/Reply). If no tunnel exists, a tunnel, i.e., PMIP Tunnel-2 28, between the HA 20 and the respective PMA, i.e., PMA2 26, (11: PMIP Tunnel 2) is set up by the process.

The PMIP-based mobility protocol is preferred when mobility is confined within a domain and wireless service providers do not want to overload the mobile node's stack by setting up a tunnel between the mobile node and the HA. A tunnel is not desirable on the mobile node because it adds extra processing and bandwidth constraints to the wireless hop.

Although PMIP provides optimization compared to other global mobility protocols, it still needs improvement in certain areas such as route optimization. Route optimization reduces the delay due to media delivery between the two communicating mobile nodes by reducing the traversal distance between the communicating hosts. The present invention fulfills a need for route optimization techniques for PMIP that will further improve the effectiveness of PMIP for both intra-domain and inter-domain movement. Several scenarios can be realized by using route optimization technique. In all the scenarios, both the correspondent node and mobile belong to a PMIP domain. In one specific scenario, the mobile node and correspondent node belong to two different MAGs that are part of the same HA or LMA. In a second scenario, the mobile and the correspondent node belong to two MAGs (PMAs) that are under different HA (LMA). Thus, in this second case, the communicating nodes belong to two different PMIP domains, where the PMIP domains may belong to the same administrative domain or different one.

BRIEF SUMMARY OF THE INVENTION

The present invention advantageously provides a solution to some of the problems of mobility management, that is, roaming and service continuity, in next generation wireless networks.

A system and method for route optimization in a proxy mobile internet protocol-based mobility management protocol is presented. The protocol has a plurality of mobile nodes each having a mobile node address and a plurality of access routers each having an access router address, the plurality of mobile nodes comprising at least a first mobile node having a local mobility anchor and being anchored at a first access router of the plurality of access routers and a second mobile node anchored at a second access router having a second access router address. The method has steps of establishing a first binding cache of the first access router, the first binding cache comprising a mapping of the mobile node addresses to the access router addresses, populating the first binding cache using an approach, and updating the mapping of the second mobile node address to a third access router address in the first binding cache in response to a handoff of the second mobile node from the second access router to a third access router, such that a packet is transmitted from the first mobile node via the first access router to the second mobile node via the mapped access router using the mapping of the second mobile node address. The approach can be either transmitting the packet from the first mobile node via the first access router to the local mobility anchor to obtain the second access router address from the local mobility anchor, or querying neighboring access routers to obtain the second access router address from the queried neighboring address routers, or broadcasting access router addresses from the local mobility anchor to obtain the second access router address from the broadcast access router addresses.

In another embodiment, the access routers are connected using a topology, such as ring, bus, or mesh, and the method includes sending a packet from the first mobile node to a first access router and from the first access router to a connected access router connected to the first access router, and if the connected access router is the second access router, sending the packet to the second mobile node via the second access router, or if the connected access router is not the second access router, transmitting the packet to another access router connected to the connected access router, the another access router becoming the connected access router, and repeating the step of transmitting until the another access router is the second access router.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 13 shows the flows associated with the route optimization procedure and handoff associated with mobiles having separate domains and MN2's movement from one MAG to another MAG.

DETAILED DESCRIPTION OF THE INVENTION

Figure 1:
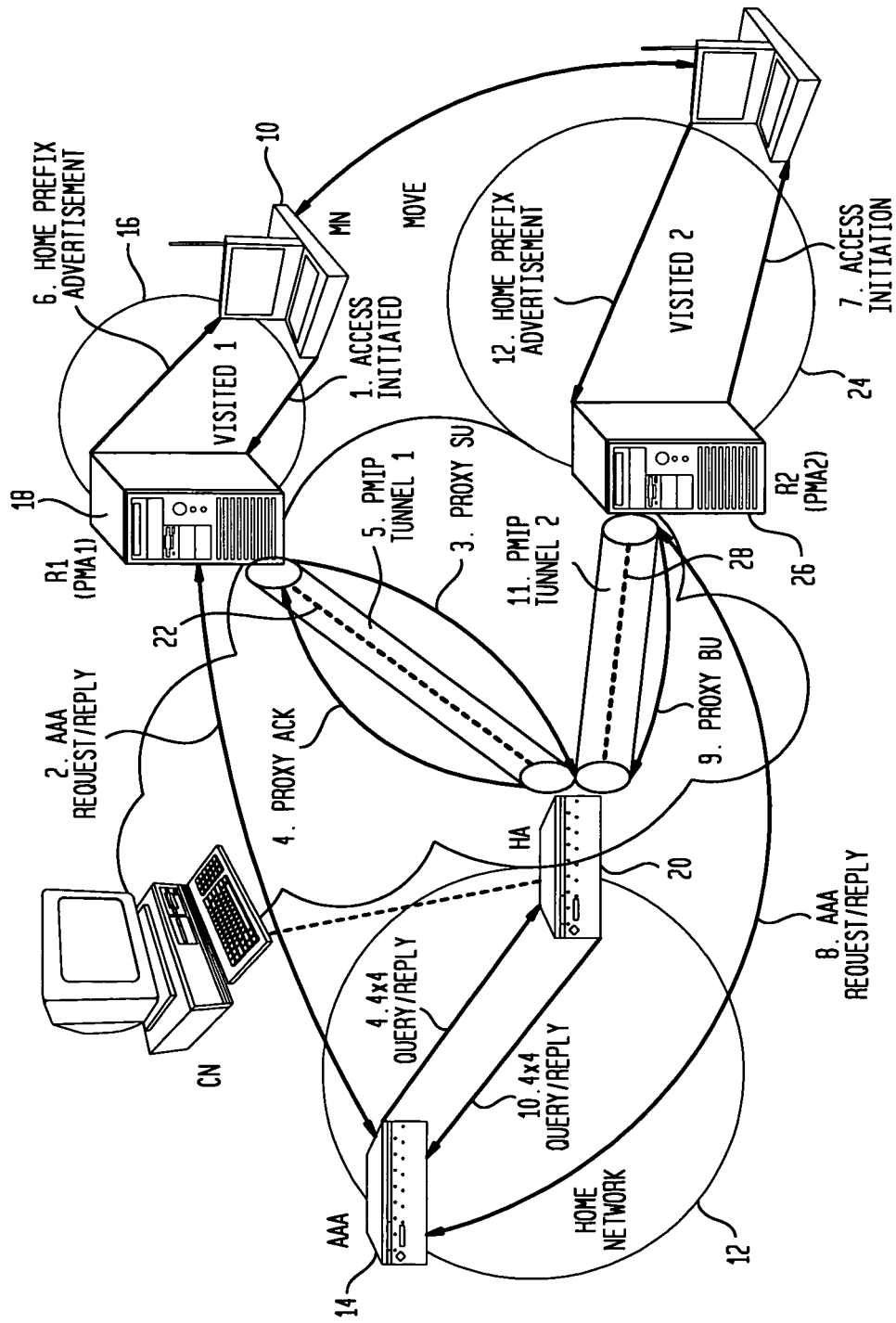
FIG. 1 illustrates network elements associated with PMIP.
Figure 2:
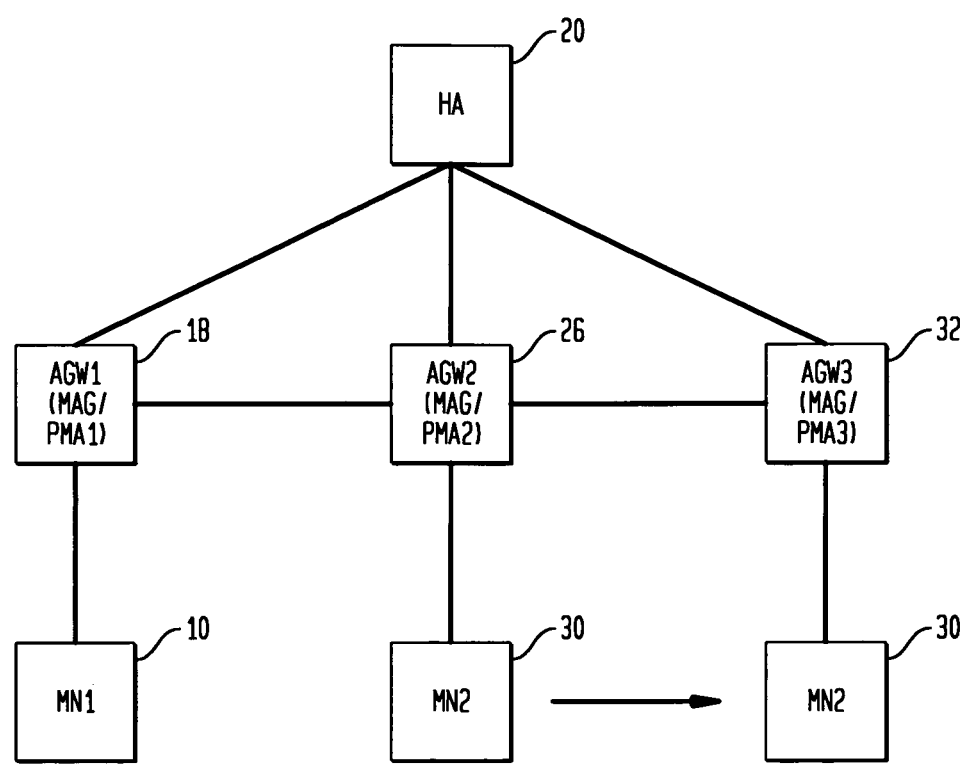
FIG. 2 illustrates a block diagram of general PMIP-based architecture.
Figure 11:
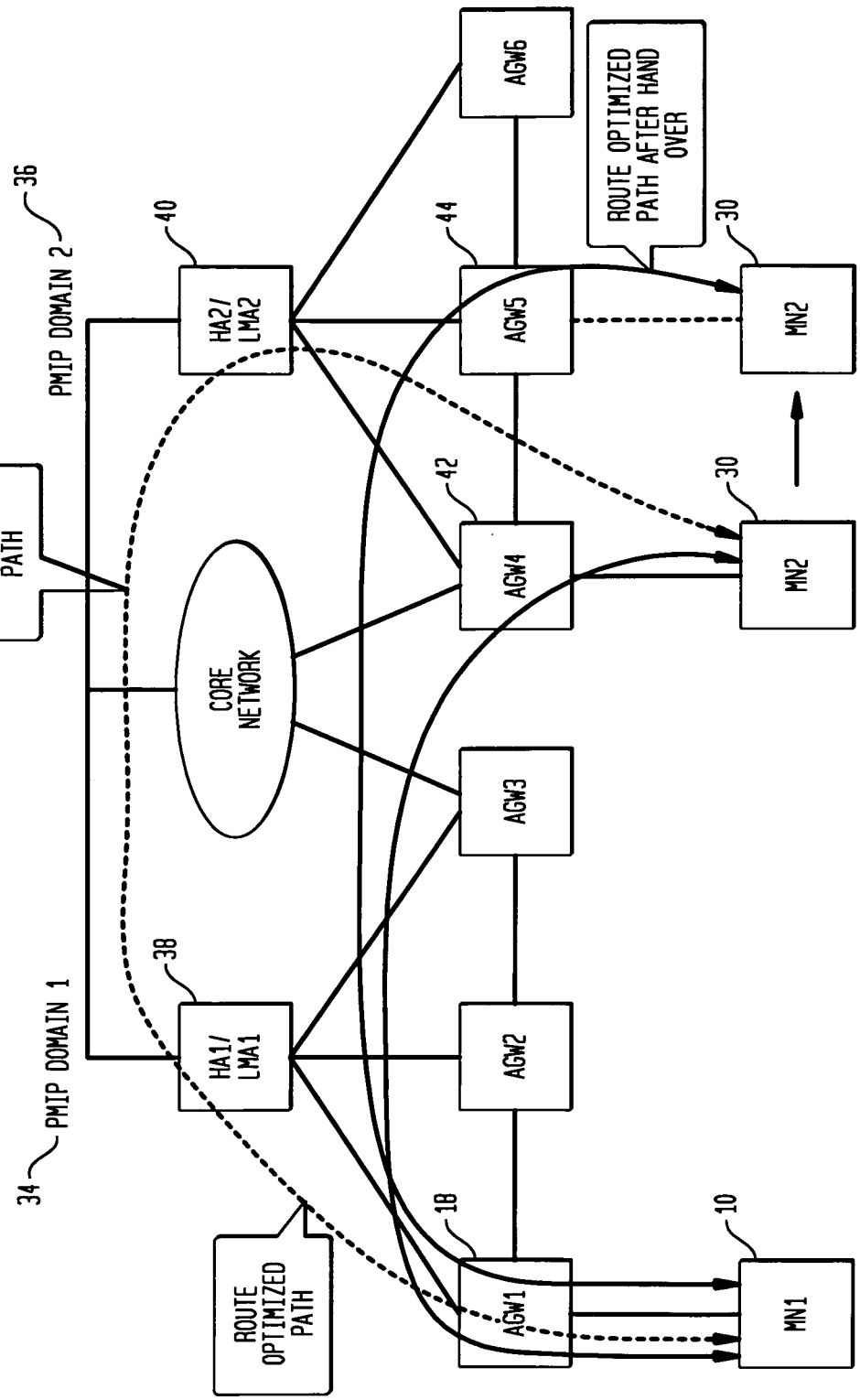
FIG. 11 shows the path optimization in the first approach, from mobile 1 in one PMIP domain to mobile 2 in another PMIP domain, where each PMIP domain may or may not belong to the same administrative domain.

Inventive route optimization techniques that could be applied to PMIP-based mobility are described below. FIG. 2 shows a generic architecture, that is, the basic network configuration, of proxy PMIP architecture that will be used to illustrate the inventive optimization techniques. Each of the Access GateWays (AGW) is actually the access router and acts like Proxy Mobility Agent (PMA). PMAs are actually Mobile Access Gateways (MAGs) in NETLMM terminology. HA is the home agent and can act like a Local Mobility Anchor (LMA). Similar architecture can span across multiple domains, with each domain being equipped with a combination of LMA and MAGs, as shown in FIG. 11.

Typically, there are several mobile nodes that communicate with each other. They could be part of the same PMIP domain, as shown in FIG. 2, or different, as shown in FIG. 11. In the scenario illustrated in FIG. 2, there is one mobile node anchored at each of the AGW or MAG 18, 26, 32. Specifically, MN1 10 is anchored at AGW1 18, MN2 30 is anchored at AGW2 26. MN2 30 establishes a communication with MN1 10 and then hands off to AGW3 32. By default, the communication between MN1 10 and MN2 30 before the handover goes via AGW1 18, HA 20 and AGW2 26, and after the handover the communication goes via AGW3 32. If the HA 20 is placed too far away from AGW 18, 26, 32, then there will be considerable one-way delay for the data traveling between the mobile nodes 10, 30. Thus, it is desirable to reduce the route associated with the data traversal. As discussed above, in this general architecture, AGWs can be compared with PMA or MAG. HA can be compared with LMA in NETLMM terminology.

Approach 1: Binding Cache Entry (BCE) at HA and MAG

Figure 3:
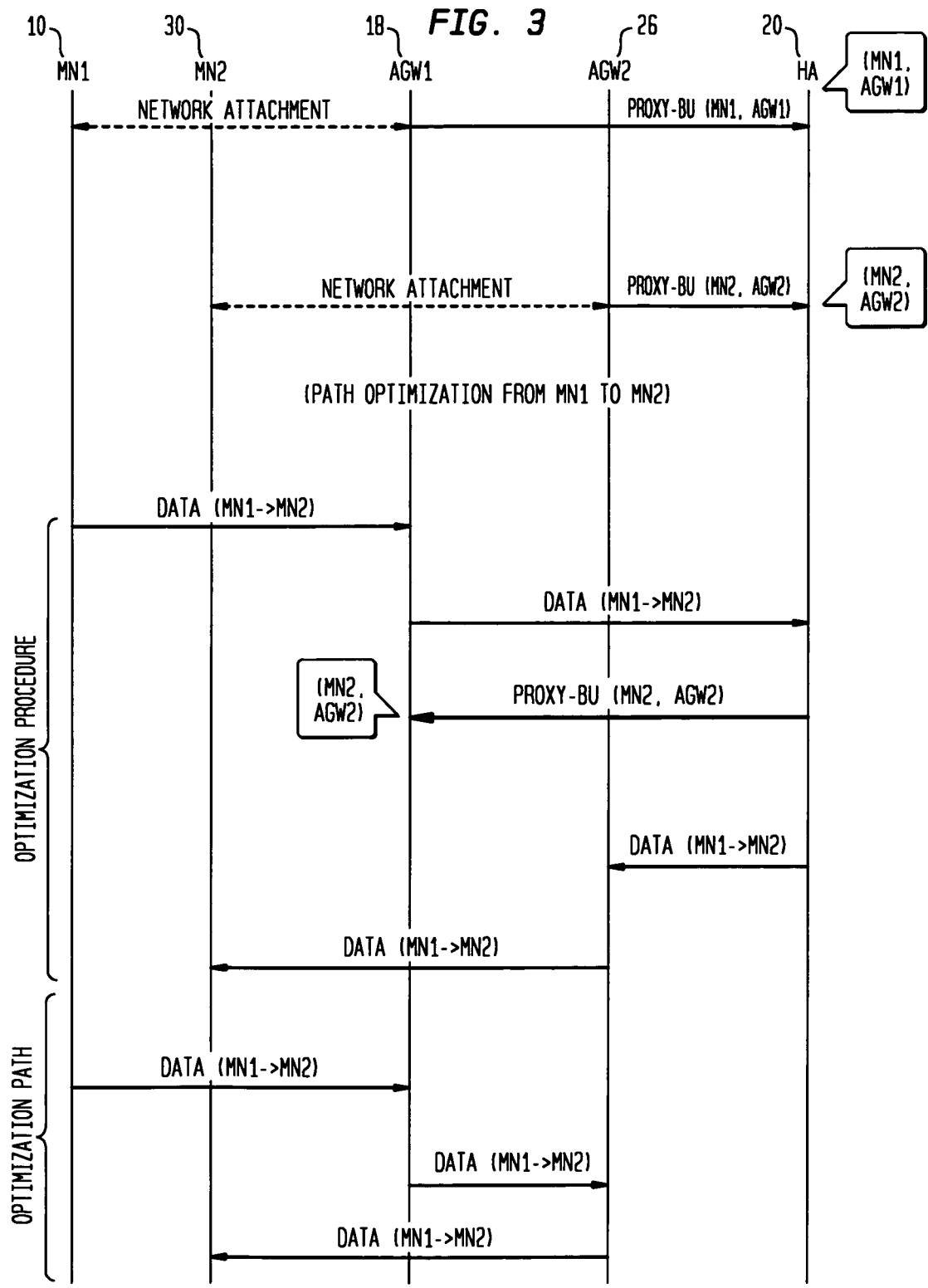
FIG. 3 illustrates the path optimization from mobile 1 to mobile 2 in a first approach.

FIGS. 3-6 show the basic optimization procedure associated with an optimization technique that utilizes the binding cache entry at the HA or LMA 20 and at the AGW or MAG 18, 26, 32. FIG. 3 illustrates the path or route optimization from MN1 10 to MN2 30. Before the handover has taken place, MN1 10 attaches to AGW1 or PMA1 18 which then sends a binding update (BU) to the HA 20 on behalf of MN1 10, creating a network attachment as PMIP tunnel 22. Similarly, MN2 30 creates a network attachment, connecting MN2 30 to AGW2 or PMA2 26, triggering the proxy-BU, or PMIP tunnel 28, to the HA 20 on behalf of MN2 30.

The BCE optimization procedure is as follows. The initial packet from MN1 10 to MN2 30 is tunneled 22, 28 to the HA 20. As soon as the HA 20 gets this packet, HA 20 knows how to forward the packet to AGW2 26, and at the same time, HA 20 also sends a proxy-BU to AGW1 18 notifying that AGW2 26 is the anchored PMA for MN2 30. AGW1 18, when obtaining this BU, establishes and maintains a cache that maps AGW2 26 with MN2 30. Similarly, AGW2 26 maintains in its cache that AGW1 18 has been notified of AGW2's association with MN2 30.

Because of AGW1's cache, any subsequent packet from MN1 10 destined to MN2 30 gets intercepted by AGW1 18 and is forwarded to AGW2 26, instead of being forwarded to the HA 20. Hence, the trajectory of the packet becomes: MN1→AGW1→AGW2→MN2 instead of MN1→AGW1→HA→AGW2→MN2. Accordingly, this new, shortened data path optimizes the route of the data packet from MN1 10 to MN2 30.

Figure 4:
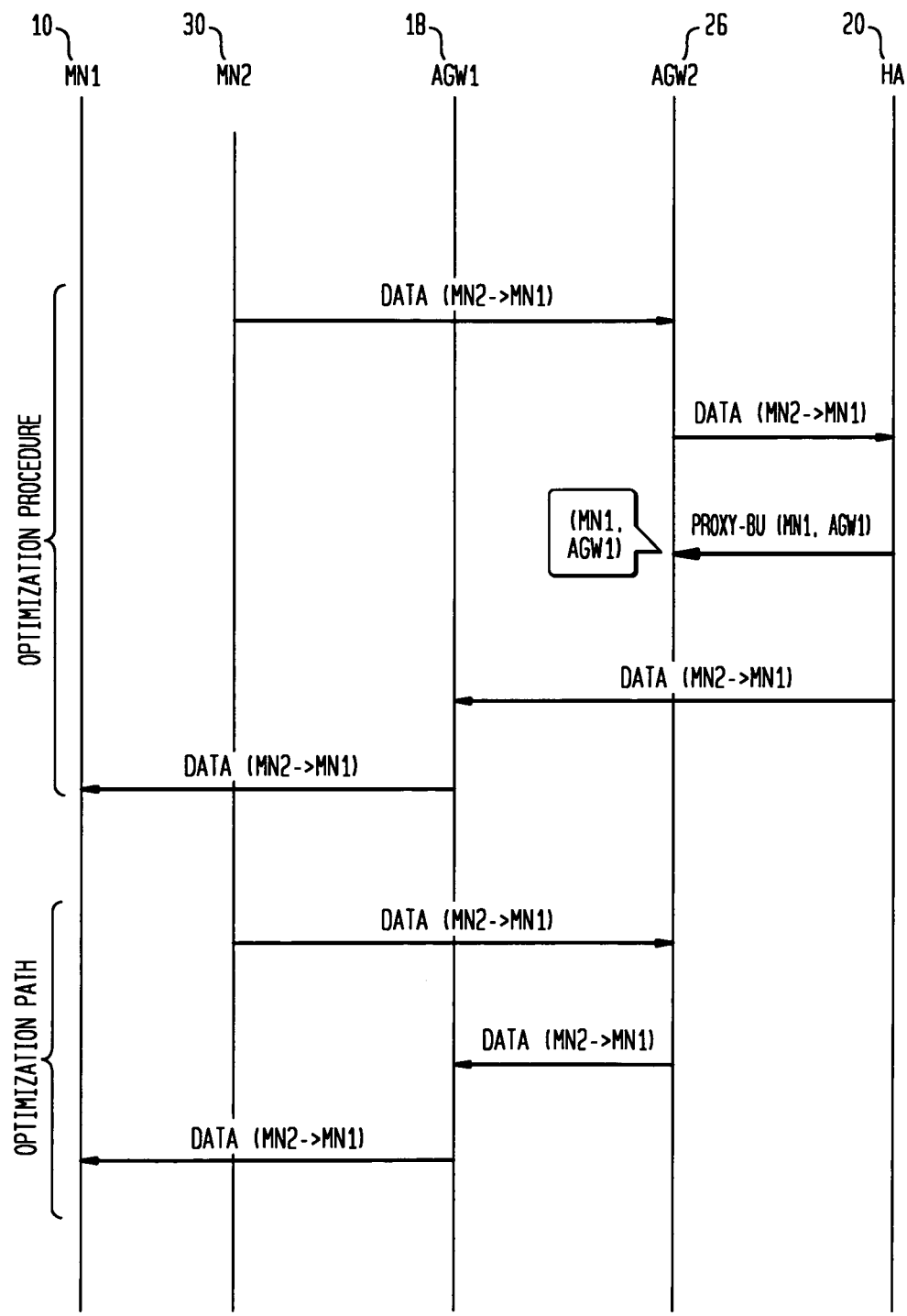
FIG. 4 illustrates the path optimization from mobile 2 to mobile 1 in the first approach.

FIG. 4 shows the optimized data path from MN2 30 to MN1 10 using the binding cache entry-based approach. In the situation illustrated in FIG. 4, during the BCE optimization procedure, the HA 20 sends the proxy-BU to AGW2 26, along with the parameters of MN1 10 and AGW1 18 to maintain the cache in AGW2 26. The result is an optimized data path from MN2 30 destined to MN1 10.

Figure 5:
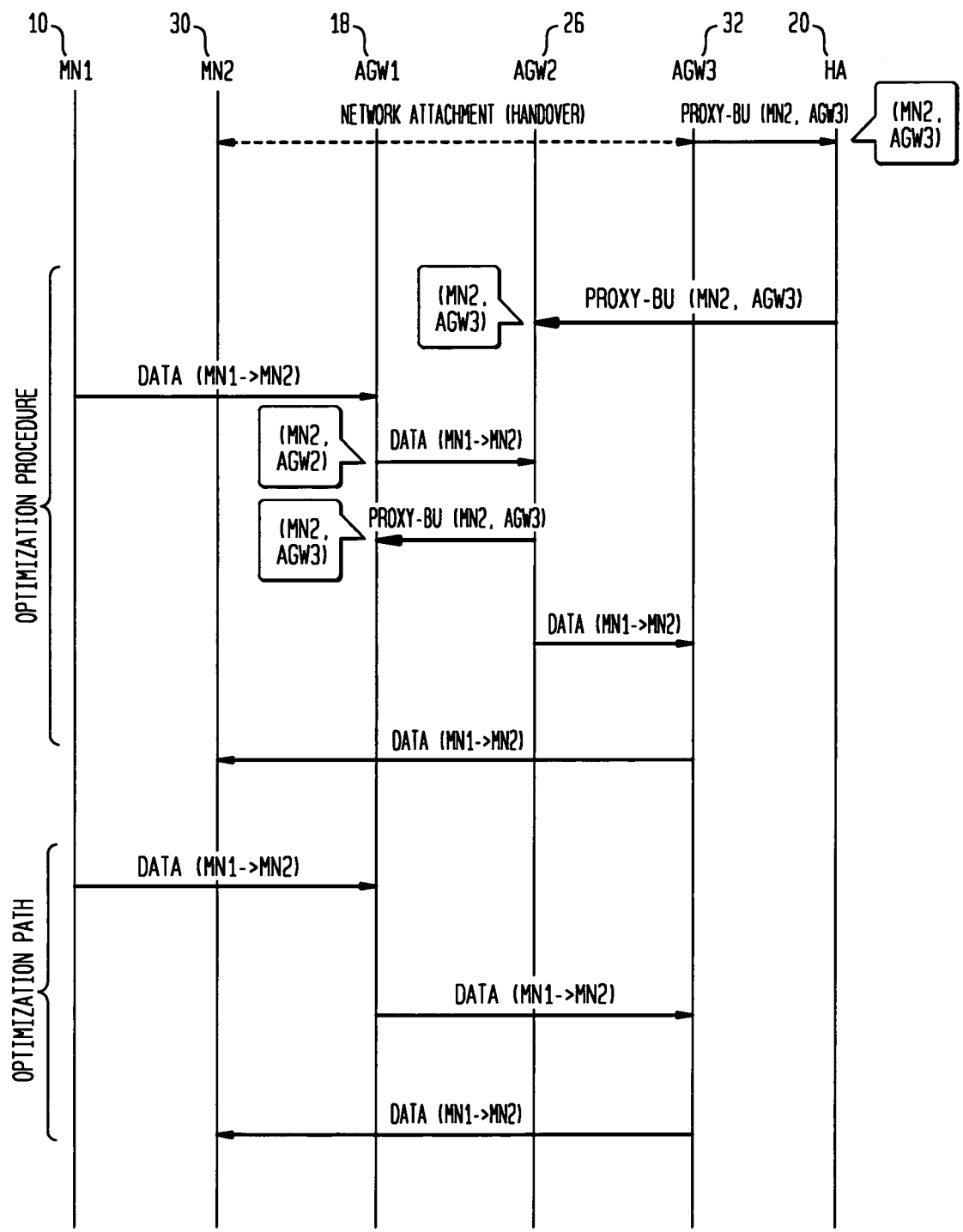
FIG. 5 illustrates the path optimization after handover from mobile 1 to mobile 2 in the first approach.

FIG. 5 shows the BCE route optimization procedure and optimized route from MN1 10 to MN2 30 after MN2 30 hands over to a new PMA such as AGW3 32. In this case, MN2 30 attaches with AGW3 32 and sends a proxy-BU to HA 20. At that point, HA 20 immediately sends a proxy-BU to AGW2 26, since the HA 20 has the knowledge of AGW2 26. Using its cache, AGW2 26 in turn sends a proxy-BU informing AGW1 18 that MN2 30 is under AGW3 32. Thus, both AGW1 18 and AGW2 26 are made aware of the fact that MN2 30 is currently connected to AGW3 32.

During the initial hand off to the new PMA 32 for MN2 30, if any data from MN1 10 destined to MN2 30 arrives at AGW1 18, it forwards the data to AGW2 26 which in turn forwards it to AGW3 32. AGW3 32 then forwards it to MN2 30. But once the BCE route optimization procedure is completed, any data destined from MN1 10 to MN2 30 gets intercepted by AGW1 18 and then gets directly forwarded to AGW3 32 which forwards it to MN2 30. Hence, the optimized data path is MN1→AGW1→AGW3→MN2.

Figure 6:
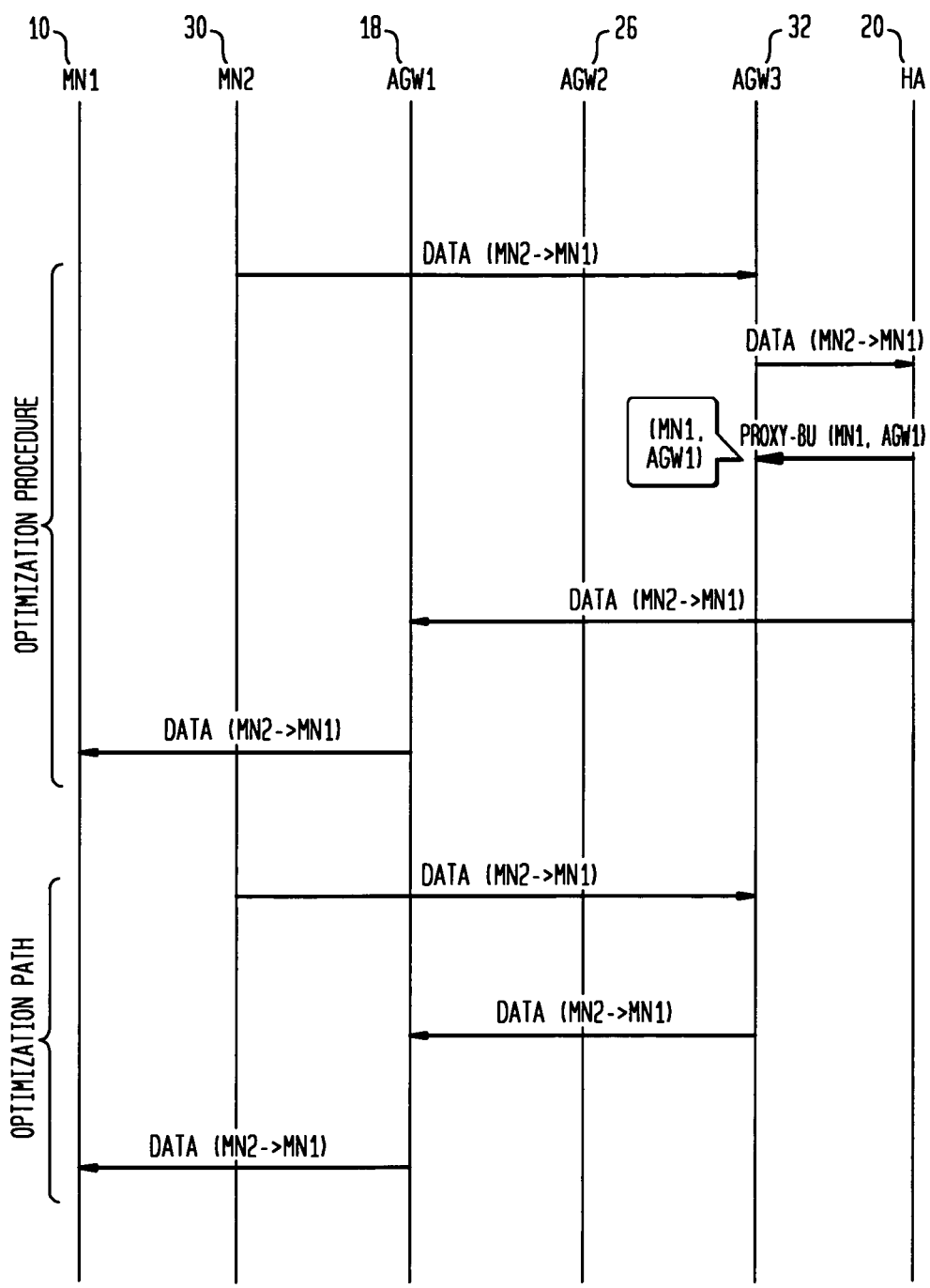
FIG. 6 illustrates the path optimization after handover from mobile 2 to mobile 1 in the first approach.

FIG. 6 shows the BCE route optimization procedure when the data is destined from MN2 30 to MN1 10 after the handover. During the establishment of the BCE route optimization, the first packet gets routed from MN2 30 to MN1 10 via HA 20 and is subjected to delay. However, after the BCE route optimization is completed, data from MN2 30 destined to MN1 10 gets picked up by AGW3 32 which sends the data to AGW1 18 to be delivered to MN1 10. Hence, the optimized data path is MN2→AGW3→AGW1→MN1 instead of MN2→AGW3→HA→AGW1→MN1.

Below, FIG. 11 shows how this specific approach can be applied to a scenario when the mobiles, e.g. MN1 10 and MN2 30, are connected to MAGs that belong to two different LMAs in two different PMIP domains.

These BCE techniques thus avoid the extra route from HA 20 to AGWs 18, 26, 32 by forwarding the traffic from one AGW or PMA 18, 26, 32 to another AGW or PMA 18, 26, 32. Nonetheless, because the binding cache entry must be established, the first packet is not subjected to route optimization.

Approach 2: Binding Query Approach

Figure 7:
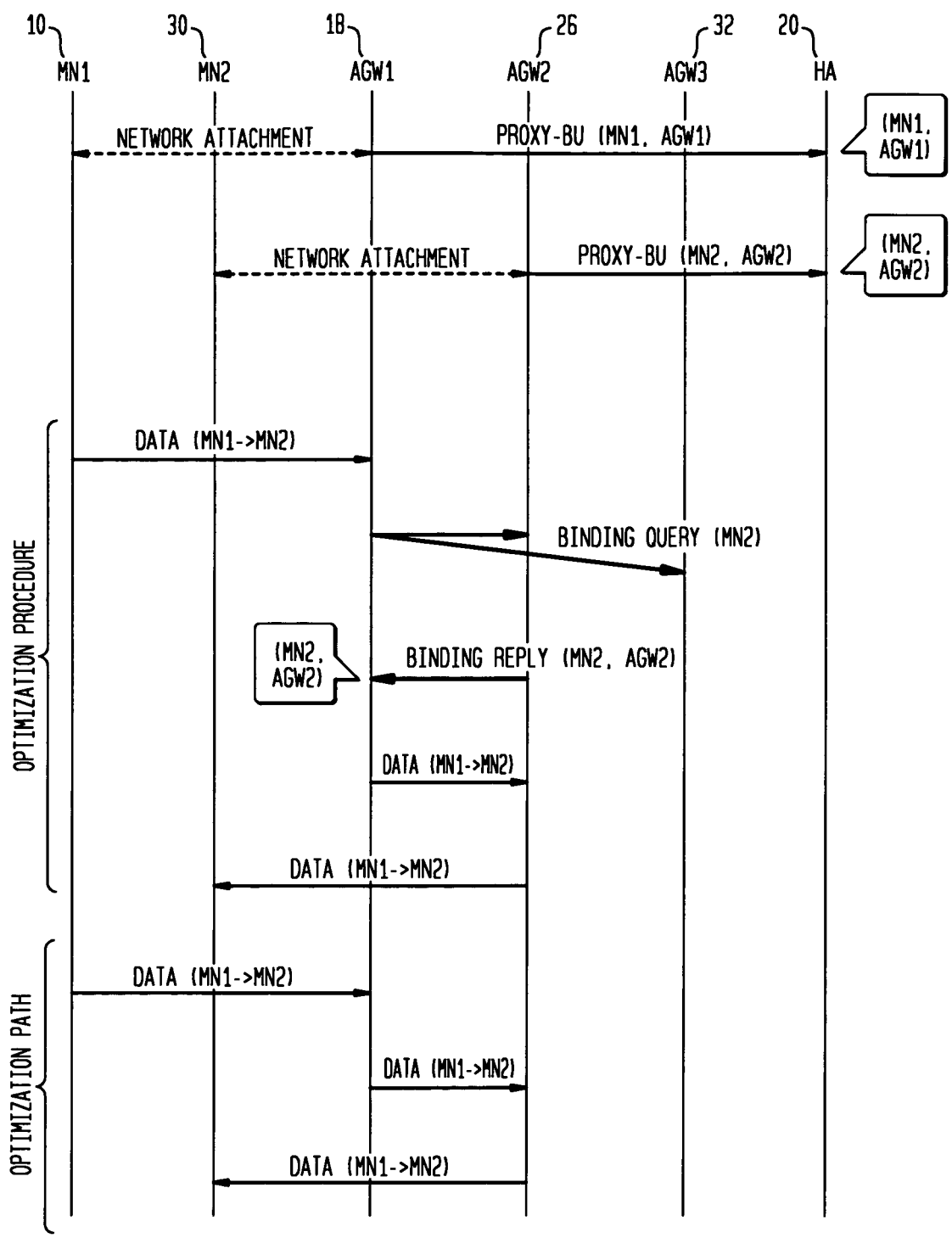
FIG. 7 illustrates the optimized route from mobile 1 to mobile 2 in a second approach.

FIG. 7 shows a second approach of an optimization technique, a technique that utilizes a binding query approach. As with the first approach, a cache is created in the MAGs, and a packet gets diverted to the appropriate PMA (MAG/AGW) 18, 26, 32 associated with the destination node, instead of getting routed to the HA 20. However, a querying approach is used for creating the cache. The example shown in FIG. 7 illustrates how AGW1 18 can query the neighboring AGWs 18, 26, 32 to find out if a specific target mobile is anchored at one of those AGWs 18, 26, 32.

As shown in FIG. 7, when a packet or data from MN1 10 destined to MN2 30 is intercepted by AGW1 18, it sends a query to the neighboring AGWs 26, 32, e.g., AGW2 26 and AGW3 32. Since MN2 30 is anchored at AGW2 26, it will send a binding reply that includes its address and the address of MN2 30. This reply information is stored in the cache of AGW1 18. Hence, AGW1 18 can directly send the data to AGW2 26 instead of forwarding the data to the HA 20, although there will be some delay for the first packet because of the associated binding query and binding reply. However, for any subsequent data destined for MN2 30, AGW1 18 does not need to send any queries, but rather examines its cache, finds MN2 30 and its anchor, AGW2 26, and forwards the data to AGW2 26 which in turn delivers it to MN2 30. As with BCE, AGW2 26 maintains a cache including that AGW1 18 has been notified of AGW2's association with MN2 30. In FIG. 7, AGW1 18 unicasts its query to a list of AGWs 26, 32; however, the query could be multicast using a localized multicast address.

In this approach, a similar procedure will take place for the packets from MN2 30 destined for MN1 10. This approach is also applicable to cases when the mobiles are under MAGs that belong to two different LMAs, as shown in FIG. 11.

Compared to the BCE approach described above, in the binding query approach, the first packet is route optimized, although it may be subjected to delay due to route look up or query. While the binding query method introduces more signaling between the AGWs, one can take advantage of localized multicast to reduce this number of signaling messages between the AGWs. This approach is also applicable to cases when the mobiles are under MAGs that belong to two different LMAs.

Approach 3: Mobile Ring-Based, Bus and Mesh-Based Solution

Figure 8:
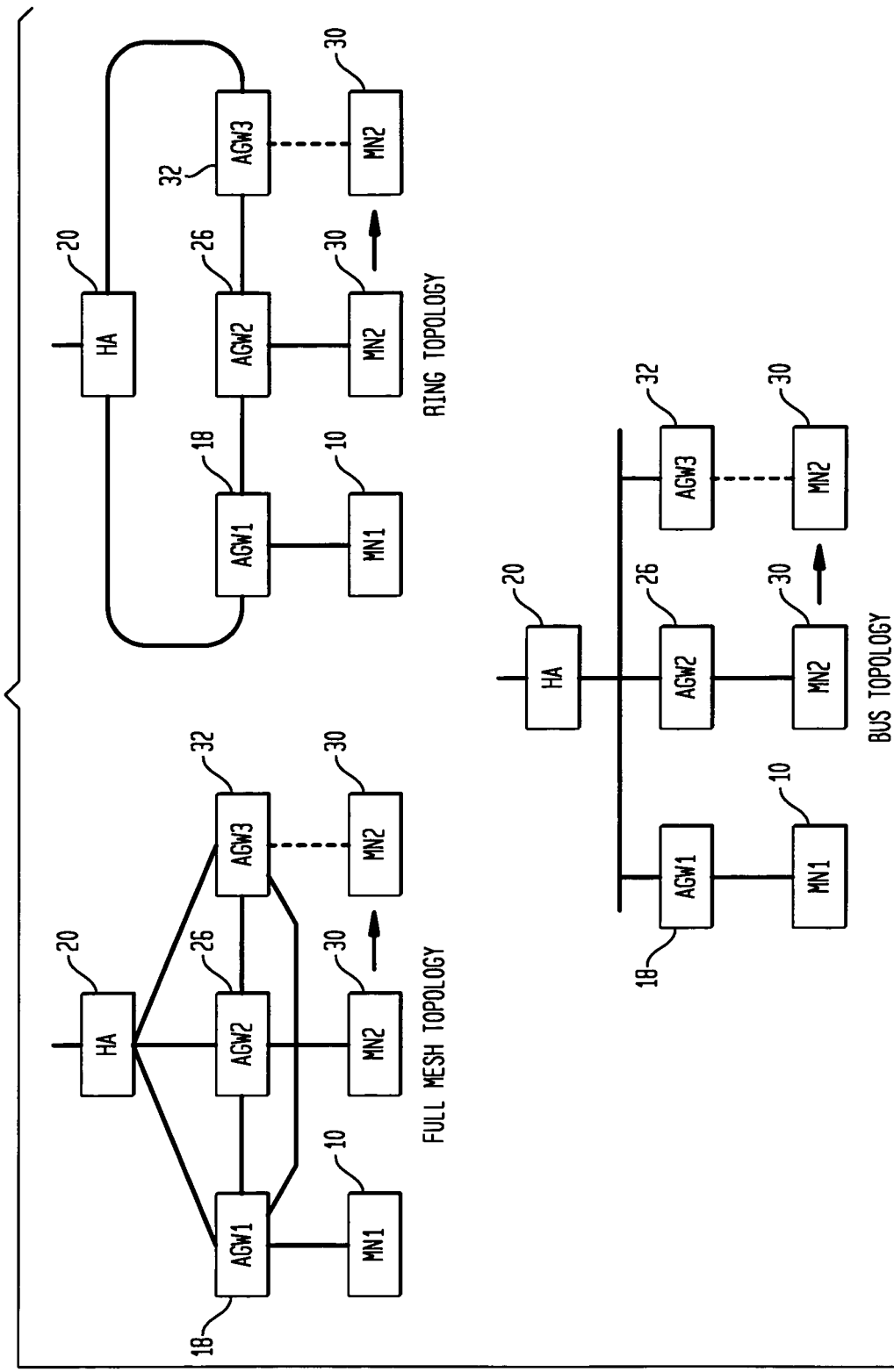
FIG. 8 illustrates network configuration topologies.
Figure 9:
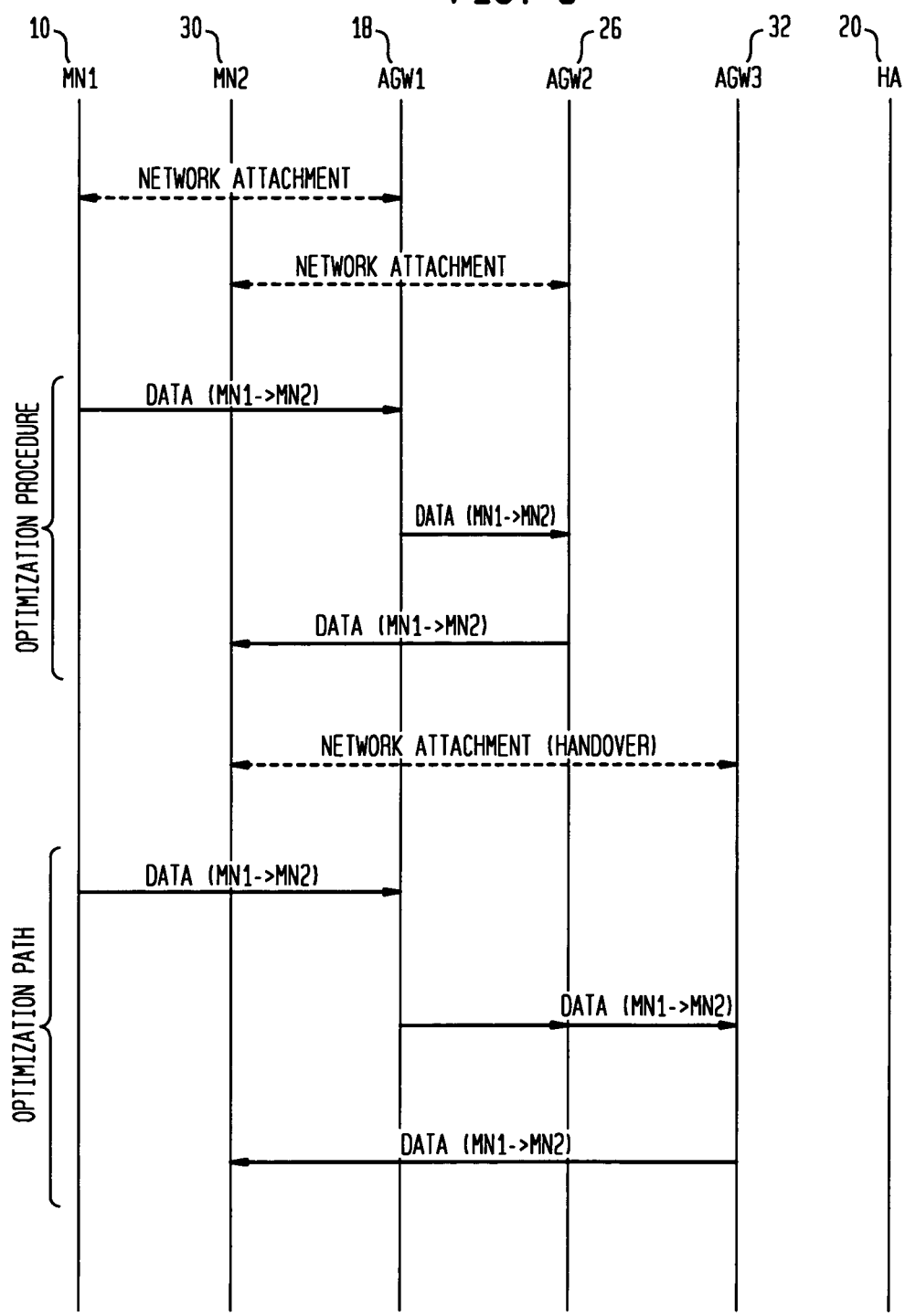
FIG. 9 illustrates the path optimization of the ring topology.

FIGS. 8 and 9 show a third approach of an optimization technique. This solution assumes that the data or packet transmitted from a sending mobile node to a receiving mobile node, for example, from MN1 10 to MN2 30, can flow through each of the access gateways, e.g., MAGs or AGWs 18, 26, 32, before it actually reaches the HA 20. In this optimization technique, during the course of the flow, the data gets dropped at the specific AGW 18, 26, 32 to which the receiving mobile node 10, 30 is anchored, and then sent from this particular AGW 18, 26, 32 to the receiving mobile node 10, 30. Accordingly, when the data flows through each of the AGWs 18, 26, 32 and HA 20 that are connected in either a ring, full mesh or bus fashion, the required data for a specific mobile node 10, 30 gets dropped at the anchor AGW 18, 26, 32 for that specific mobile node 10, 30.

FIG. 8 shows three possible network configuration topologies, e.g., full mesh, ring, and bus topology, that, combined with add/drop technology, can provide PMIP route optimization. As shown in FIG. 8, data traffic destined from MN1 10 to MN2 30, or from MN2 30 to MN1 10, can take advantage of this add/drop technique while traveling via any one of these topologies.

FIG. 9 illustrates this approach, based on the ring topology of FIG. 8 (upper right). FIG. 9 shows that data transmitted from MN1 10 to MN2 30 will get dropped at AGW2 26 which will forward it to MN2 30, bypassing HA 20. Similarly, after MN2 30 hands over to AGW3 32, it becomes the anchor AGW for MN2 30. Hence, any data destined to MN2 30 now, i.e. after handoff, gets dropped at AGW3 32 without being forwarded to HA 20. AGW3 32 forwards this packet to MN2 30, as AGW3 32 is the current anchor for MN2 30.

As discussed above, various network configuration topologies in conjunction with add/drop technique can provide PMIP route optimization. This technique offers several advantages, such as no additional signaling traffic among AGWs and no signaling traffic during mobile node's handover or handoff is generated, and no Binding Cache Entries at the AGWs for other, non-associated mobiles are required. In order to take the best advantage of this technique, a network with broadcast or multicast capability should be used. A ring-based network that has the ability of using the resilient packet ring is an exemplary embodiment of this approach.

Approach 4: Multicasting Binding Cache to AGWs

Figure 10:
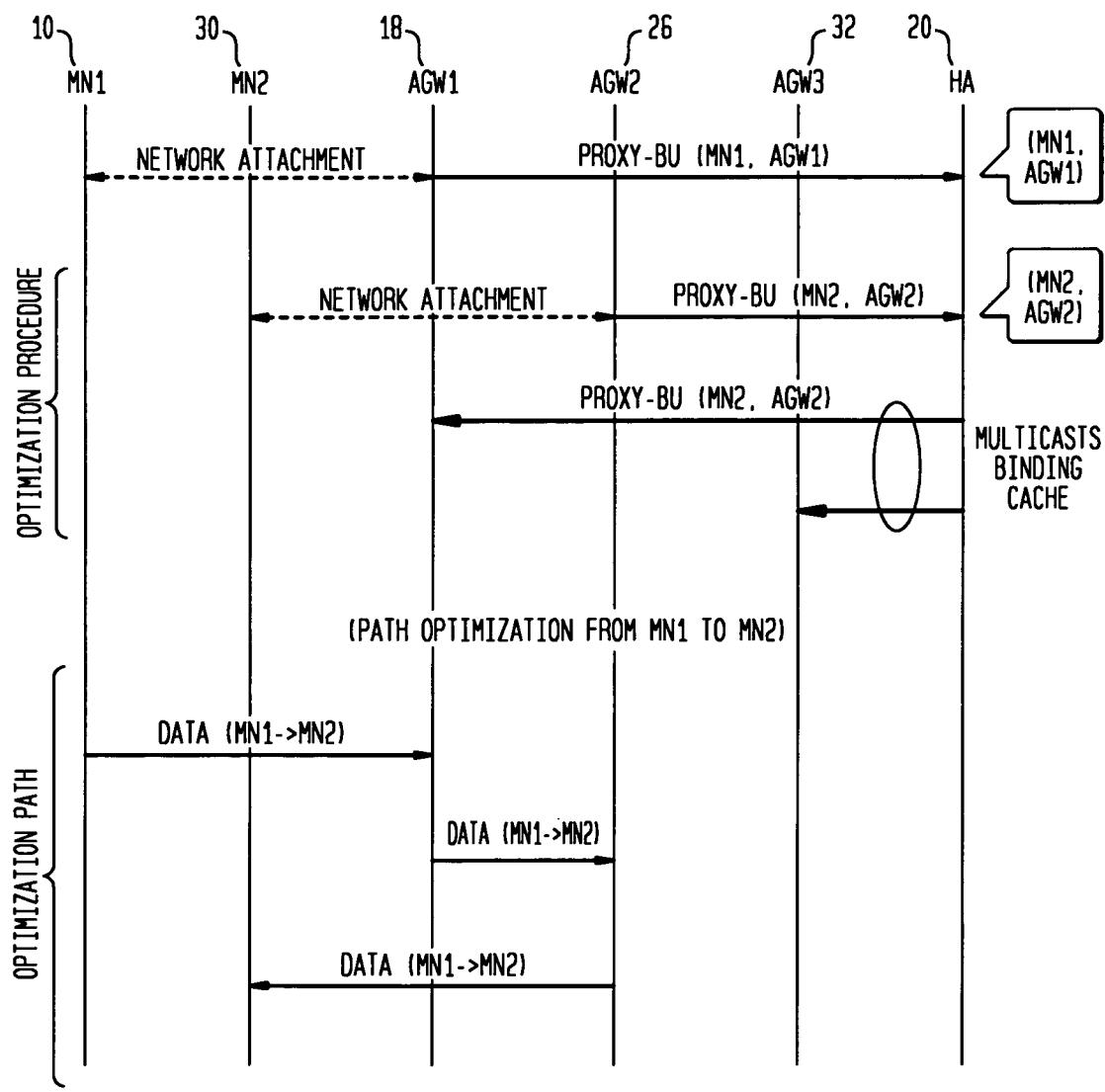
FIG. 10 illustrates path optimization from mobile 1 to mobile 2 in a fourth approach.

FIG. 10 show an optimization technique that performs route optimization through the use of multicasting binding cache. As with approach 1 described above, in this approach when a mobile node gets anchored with the AGW or PMA 18, 26, 32, it sends BU to the HA 20. Thus, at any point in time, HA 20 maintains a binding cache with a mapping of each mobile node and its respective PMA 18, 26, 32. Since the HA 20 is in the local domain, it can multicast its binding cache to all the PMAs (AGWs) 18, 26, 32 that act as anchors for the respective mobile nodes. HA 20 can use localized scope-based multicast to communicate with the PMAs 18, 26, 32 that are under the domain of HA 20. This enables the neighboring AGWs 18, 26, 32 to have the binding cache entry before any data is transmitted.

As shown in FIG. 10, when a data from MN1 10 for MN2 30 arrives at AGW1 18, it can look up the local cache and forward the traffic to the respective anchor PMA, which is AGW2 26 in this example. As with approach 1, this approach is also applicable to cases when the mobiles are under MAGs that belong to two different LMAs, as shown in FIG. 11. Unlike approach 1, however, the first data packet also gets routed through the optimized path, since the AGWs have been updated as part of the proxy binding updates that have been multicast to the AGWs. If additional mobile nodes connect to the AGWs, then binding cache at the HA 20 gets updated, which in turn updates the AGWs by way of localized multicasting.

Mobile Nodes in Different Domains

FIG. 11 illustrates the path optimization described in approach 1. In the scenario shown in FIG. 11, MN1 10 is in PMIP domain 1 34 while MN2 30 is in PMIP domain 2 36. Before path optimization, illustrated by the dotted line, the initial packet from MN1 10 to MN2 30 goes to HA1/LMA1 38 in PMIP domain 1 34. As soon as this packet is received at HA1 38, it knows how to forward the packet to HA2/LMA2 40 in PMIP domain 2 36. HA2 40 forwards the packet to the gateway associated with MN2 30, e.g., AGW4 42, and at the same time, HA2 40 also notifies HA1 38 who sends a proxy-BU to AGW1 18 notifying it that AGW4 42 is the anchored PMA for MN2 30. AGW1 18, when obtaining this BU, establishes and maintains a cache that maps AGW4 42 with MN2 30. Similarly, AGW4 42 maintains in its cache that AGW1 18 has been notified of AGW4's association with MN2 30.

Because of AGW1's cache, any subsequent packet from MN1 10 destined to MN2 30 gets intercepted by AGW1 18 and is forwarded to AGW4 42, instead of being forwarded to either HA1 38 or HA2 40. Hence, the trajectory of the packet becomes: MN1→AGW1→AGW4→MN2 instead of MN1→AGW1→HA1→HA2→AGW4→MN2. Accordingly, this new, shortened data path optimizes the route of the data packet from MN1 10 in PMIP domain 1 34 to MN2 30 in PMIP domain 2 36.

Figure 12:
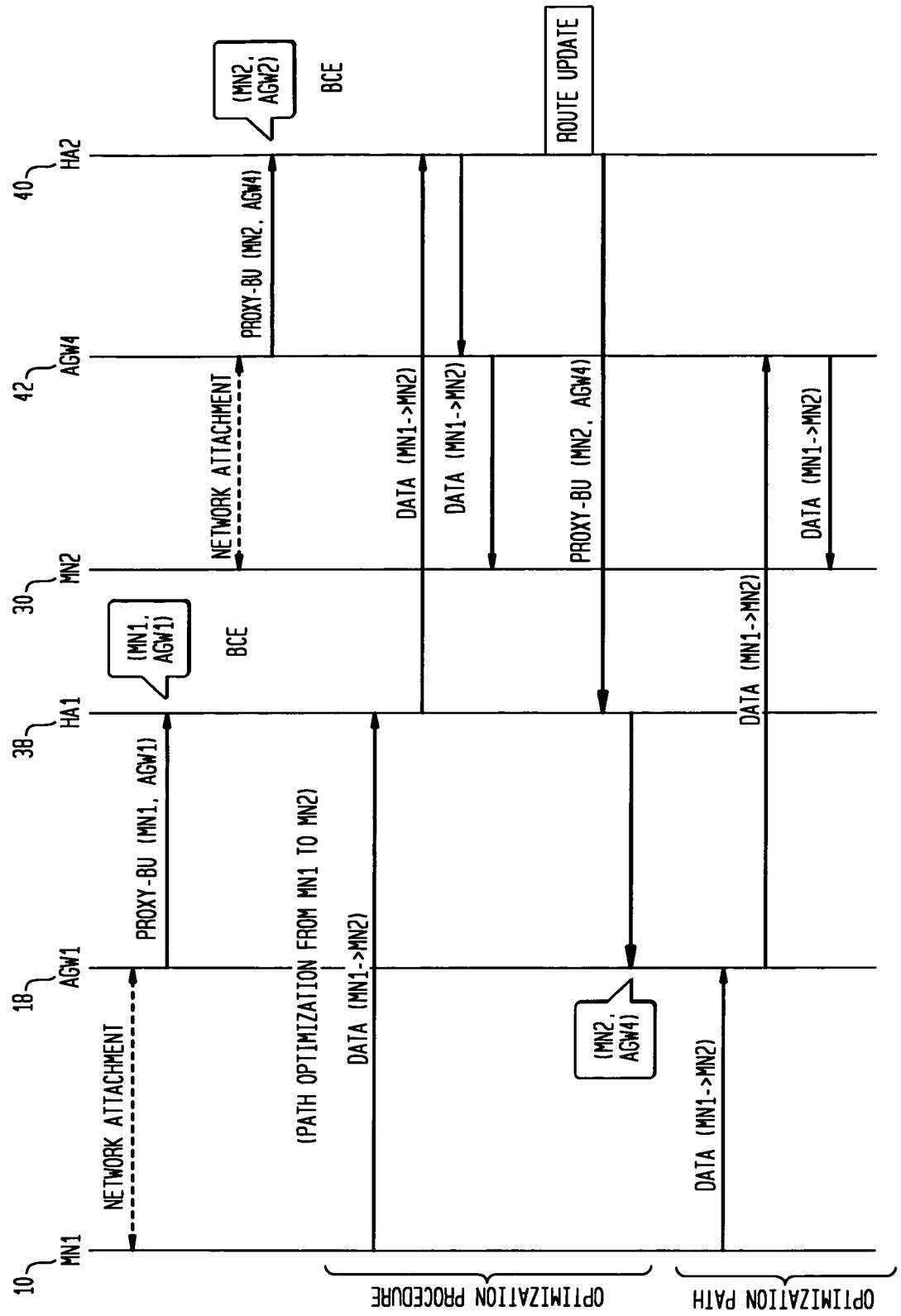
FIG. 12 shows the flows associated with the route optimization procedure associated with mobiles having separate domains and MN2's attachment to a MAG.

FIG. 12 shows the two data paths, both non-optimized and optimized, from MN2 30 in PMIP domain 2 36 to MN1 10 in PMIP domain 2 34 using the binding cache entry-based approach. In the situation illustrated in FIG. 12, prior to the BCE optimization procedure, AGW1 18 has a proxy-BU with HA1 38, and AGW4 42 has a proxy-BU with HA2 40. During path optimization from MN1 10 to MN2 30, HA1 38 sends data to HA2 40, along with the parameters of MN1 10 and AGW1 18 to maintain the cache in AGW4 42. The result is an optimized data path from MN2 30 destined to MN1 10 in which the data travels from MN1 10 to AGW1 18 in PMIP domain 1 34, and then the data travels directly from AGW1 18 to AGW4 42 and on to MN2 30 in PMIP domain 2.

FIG. 13 shows the BCE route optimization procedure and optimized route from MN1 10 in PMIP domain 1 34 to MN2 30 after MN2 30 hands over to a new PMA such as AGW5 44 in PMIP domain 2 36. In this case, MN2 30 attaches with AGW5 44 and sends a proxy-BU to HA2 40. At that point, HA2 40 immediately sends a proxy-BU to AGW4 42, since the HA2 40 has the knowledge of AGW4 42. Using its cache, AGW4 42 in turn sends a proxy-BU informing AGW1 18 that MN2 30 is under AGW5 44. Thus, both AGW1 18 and AGW4 42 are made aware of the fact that MN2 30 is currently connected to AGW5 44. Hence, the optimized data path after handoff is MN1→AGW1→AGW5→MN2.

Accordingly, as discussed above, route optimization can be achieved for mobile nodes in two separate PMIP domains using approaches 1, 2 and 4 above.

While the present invention has been described in particular embodiments, it should be appreciated that the present invention should not be construed as limited by such embodiments, but rather construed according to the claims below.

What is claimed is:

1. A method for route optimization in a proxy mobile internet protocol-based mobility management protocol having a plurality of mobile nodes each having a mobile node address and a plurality of access routers each having an access router address, said plurality of mobile nodes comprising at least a first mobile node having a local mobility anchor and being anchored at a first access router of said plurality of access routers and a second mobile node anchored at a second access router having a second access router address, where the mobile nodes may belong to different local mobility anchors, the mobile node address remaining unchanged as the associated mobile node changes access routers to which it is anchored, said method comprising the steps of:

establishing a first binding cache of said first access router in a local mobility anchor, said first binding cache comprising a mapping of one or more of said plurality of mobile node addresses to one or more of said plurality of access router addresses;

populating said first binding cache using an approach;

updating said mapping of said second mobile node address to a third access router address in said first binding cache in response to a handoff of said second mobile node from said second access router to a third access router;

transmitting a packet from said first mobile node via said first access router directly to said second mobile node via one of said second access router and said third access router, based on said mapping of said second mobile node address; and saving the first access router address and an indicator in a second binding cache in a mapped access router of said second mobile node, the indicator indicating that notification has been made to the first access router of association of the second access router with the second mobile node, wherein the approach comprises the steps of:
    querying neighboring access routers; and
    obtaining the second access router address from the queried neighboring address routers.

2. The method according to claim 1, further comprising a step of communicating, using localized scope-based multicast, the first binding cache to one or more of the plurality of access routers acting as anchors for respective one or more of the plurality of mobile nodes.

3. A computer readable non-transitory medium having computer readable program for operating on a computer program for route optimization in a proxy mobile internet protocol-based mobility management protocol having a plurality of mobile nodes each having a mobile node address and a plurality of access routers each having an access router address, said plurality of mobile nodes comprising at least a first mobile node having a local mobility anchor and being anchored at a first access router of said plurality of access routers and a second mobile node anchored at a second access router having a second access router address, where the mobile nodes may belong to different local mobility anchors, the mobile node address remaining unchanged as the associated mobile node changes access routers to which it is anchored, said program comprising instructions that cause the computer to perform the steps of:

establishing a first binding cache of said first access router in a local mobility anchor, said first binding cache comprising a mapping of one or more of said plurality of mobile node addresses to one or more of said plurality of access router addresses;

populating said first binding cache using an approach;

updating said mapping of said second mobile node address to a third access router address in said first binding cache in response to a handoff of said second mobile node from said second access router to a third access router;

transmitting a packet from said first mobile node via said first access router directly to said second mobile node via one of said second access router and said third access router, based on said mapping of said second mobile node address; and saving the first access router address and an indicator in a second binding in a mapped access router of said second mobile node, the indicator indicating that notification has been made to the first access router of association of the second access router with the second mobile node, wherein the approach comprises:
    querying neighboring access routers; and
    obtaining the second access router address from the queried neighboring address routers.

4. The computer readable program according to claim 3, further comprising communicating, using localized scope-based multicast, the first binding cache to one or more of the plurality of access routers acting as anchors for respective one or more of the plurality of mobile nodes.

5. A system for route optimization in a proxy mobile internet protocol-based mobility management protocol having a plurality of mobile nodes each having a mobile node address and a plurality of access routers each having an access router address, said plurality of mobile nodes comprising at least a first mobile node having a local mobility anchor and being anchored at a first access router of said plurality of access routers and a second mobile node anchored at a second access router having a second access router address, where the mobile nodes may belong to different local mobility anchors, the mobile node address remaining unchanged as the associated mobile node changes access routers to which it is anchored said system comprising:

a first binding cache of said first access router in a local mobility anchor, said first binding cache comprising a mapping of one or more of said plurality of mobile node addresses to one or more of said plurality of access router addresses;

an approach for populating said first binding cache;

a handoff of said second mobile node from said second access router to a third access router; and a second binding cache in said mapped access router of said second mobile node, said second binding cache having a mapping of said first mobile node address to said first access router address and an indicator indicating that notification has been made to the first access router of association of the second access router with the second mobile node, wherein said mapping of said second mobile node address to a third access router address in said first binding cache is updated in response to said handoff and a packet is transmitted from said first mobile node via said first access router to said second mobile node via one of said second access router and said third access router, based on said mapping of said second mobile node address, and said approach comprises querying neighboring access routers and obtaining the second access router address from the queried neighboring address routers.

6. The system according to claim 5, wherein the first binding cache is communicated, using localized scope-based multicast, to one or more of the plurality of access routers acting as anchors for respective one or more of the plurality of mobile nodes.

* * * * *

UNITED STATES PATENT AND TRADEMARK OFFICE
CERTIFICATE OF CORRECTION

PATENT NO.       : 8,670,407 B2
APPLICATION NO.  : 12/012014
DATED            : March 11, 2014
INVENTOR(S)      : Dutta et al.

It is certified that error appears in the above-identified patent and that said Letters Patent is hereby corrected as shown below:

In the Specification

In Column 1, Line 48, delete "(IDNP)," and insert -- (IDMP), --, therefor.

Signed and Sealed this
Seventh Day of April, 2015

Michelle K. Lee
*Director of the United States Patent and Trademark Office*